Dec. 13, 1938. H. H. McKEE 2,140,162
MEAT TREATING METHOD
Original Filed June 6, 1929   3 Sheets-Sheet 1

Harry H. McKee
INVENTOR

Witness-
Wm. C. Meiser

BY
ATTORNEY

Dec. 13, 1938.   H. H. McKEE   2,140,162
MEAT TREATING METHOD
Original Filed June 6, 1929   3 Sheets-Sheet 2

Harry H. McKee
INVENTOR

Witness-
Wm C. Meiser

BY
ATTORNEY

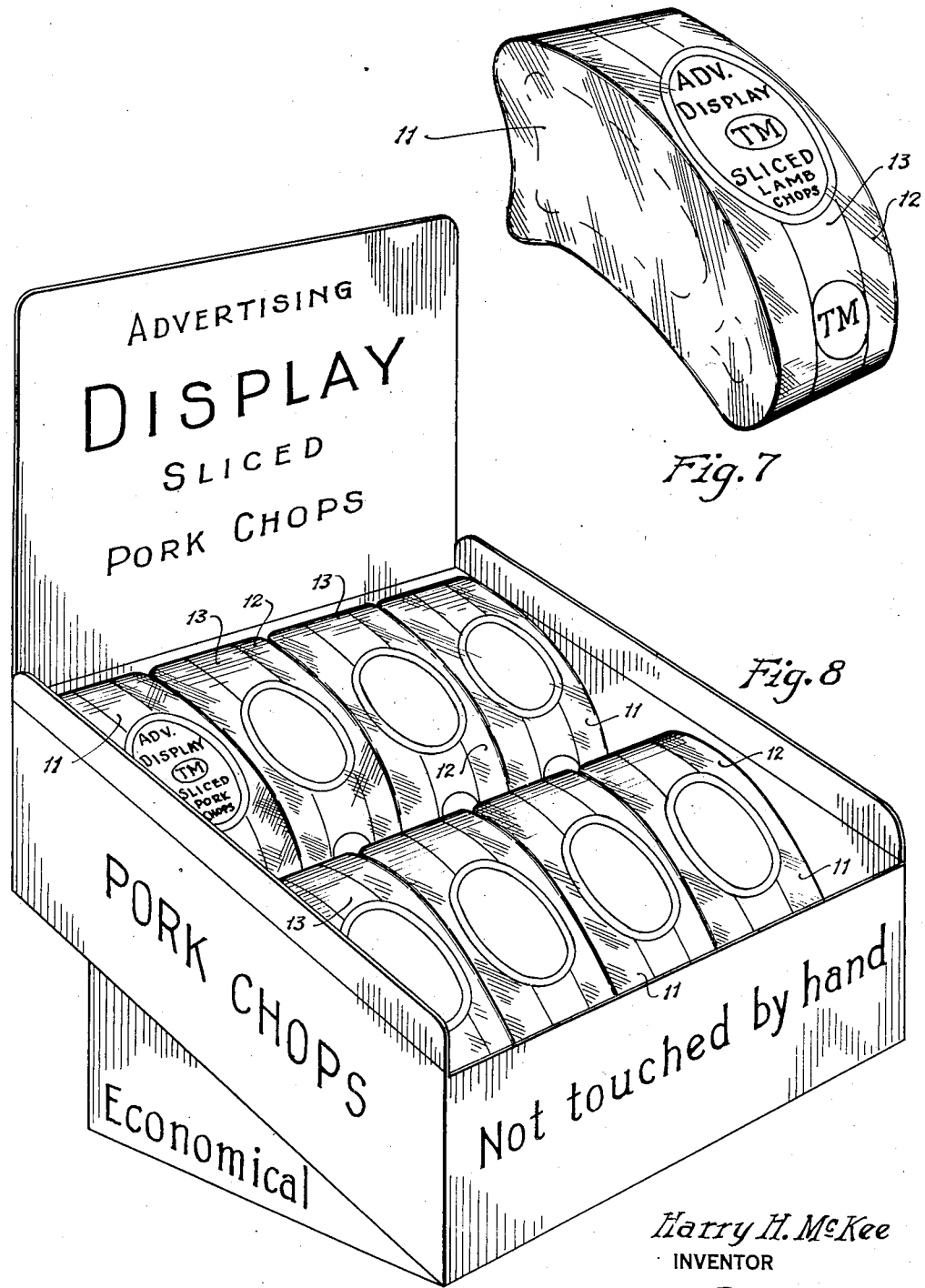

Patented Dec. 13, 1938

2,140,162

UNITED STATES PATENT OFFICE 2,140,162

MEAT TREATING METHOD

Harry H. McKee, Chicago, Ill., assignor to Swift & Company, Chicago, Ill., a corporation of Illinois Continuation of application June 6, 1929, Serial No. 368,941. Divided and this application April 1, 1935, Serial No. 14,002. In Canada April 25, 1930

3 Claims. (Cl. 99—107)

This invention relates to packing house methods and products, and especially to the slicing of meats either with or without bone, and to meat conditioning steps preliminary to the slicing.

This application is a continuation of my application entitled "Meat treating method and product", filed June 6, 1929, Serial No. 368,941.

The main objects of this invention are to provide for systematically slicing standard carcass parts at the packing house ready for delivery to retail markets; to provide improved methods of conditioning the meat previous to slicing whereby it may be more efficiently handled in automatic slicing machines; to provide for slicing such meats through the meat and bone by a knifelike cutting operation so that the surfaces will be smooth and clean, resulting in a saving of the meat from loss of juices, avoidance of discoloration by bone sawdust as commonly results from the old method of sawing through the bones in slicing, and obviating unnecessary exposure of the cut surfaces to the air; and to provide for so slicing the meat as to facilitate reassemblage of the slices in their natural relative positions or to retain such relationship between the slices so that the original shape of the carcass part may be maintained for package delivery to the retail markets or so that packages containing a number of slices, as lamb chops, will present an even, attractive appearance; and by these methods and means and the advantages resulting therefrom to enhance the marketability of meats.

Illustrative examples of the product of this invention are shown by the accompanying drawings in which:

Figure 6 is a horizontal sectional view, showing how sliced chops are packed in a pail or the like.

Figure 7 is a perspective view of a transparent package of chops, designed for attractive display.

Figure 8 is a perspective view of a display carton of such packages.

The invention comprises the improved method herein described whereby bone-dust-free sliced meat is produced, which, due to the absence of bone dust and surface tearing and the immediate reassemblage of the slices, retains its fresh natural color.

A preferred embodiment of my improved process consists mainly in first freezing the fresh meat sufficiently to substantially rigidify or set the entire mass thereof, and then subjecting the same to an automatic slicing machine of the knife-edge cutting variety, preferably power operated, whereby the meat is uniformly sliced in a single cutting operation through the bone and tissue. In the case of certain products, such as ham, a part of the edge tissue on one side may be left uncut to aid in retention of the slices in pre-sliced relationship.

A further step thereof, consists in retaining or reassembling the slices and securing the same in substantially their original relative position whereby the external shape and appearance of the meat part is retained, and the surfaces of the slices are protected from the air and possible contamination by handling or oxidation. The sliced product as a whole is then rechilled if desired and placed in a cold environment and held ready for shipment.

Figure 1:
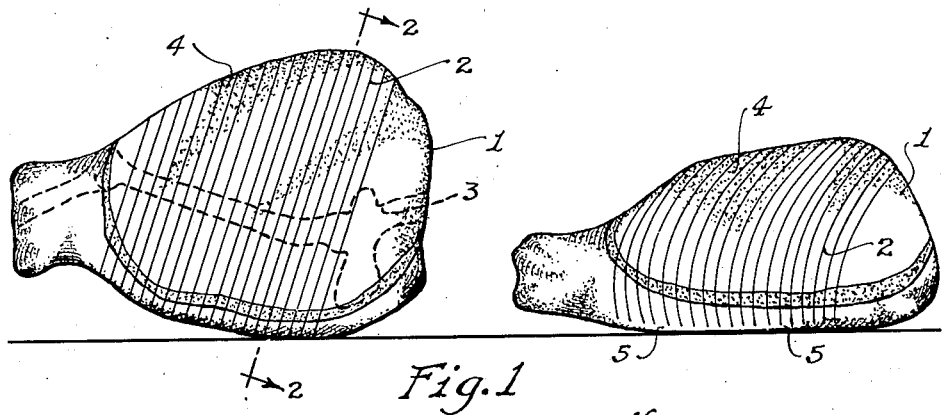
Figure 1 shows a plan and a side view of a sliced ham with the slices all in their natural positions, the butt and hock portions being left unsliced and all parts being attached together by a narrow uncut strip along one side.
Figure 2:
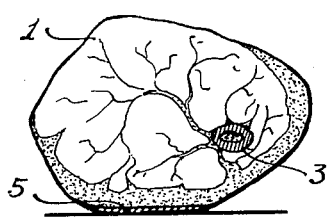
Figure 2 is a section on the line 2—2 of Figure 1.
Figure 3:
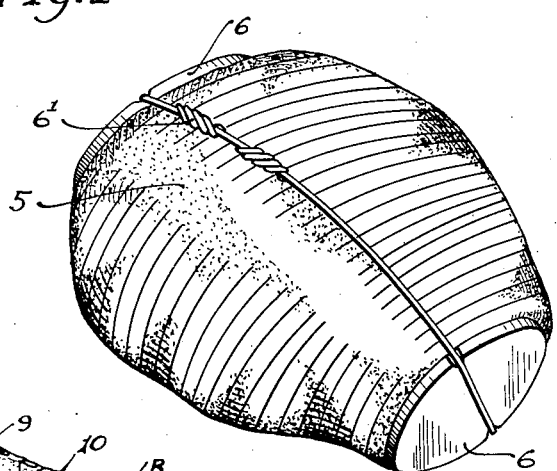
Figure 3 is a perspective view of a sliced ham with the slices held pressed together in airtight contact with each other by means of a pair of wooden disks at the ends and a wire tie connecting them.
Figure 10:
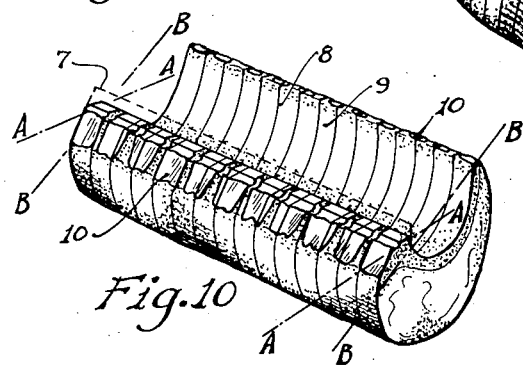
Figure 10 is a perspective view of a portion of such a loin uniformly sliced, showing that the slices are uniform, though the rib spacing varies, the dotted outline indicating the part cut away.
Figure 9:
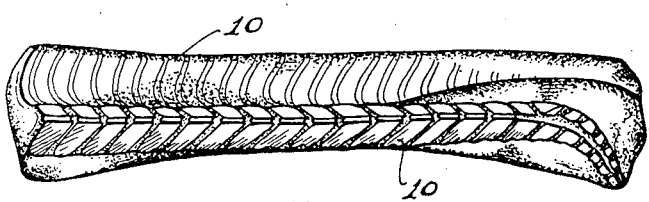
Figure 9 is a perspective view of a loin trimmed prior to slicing.
Figure 4:
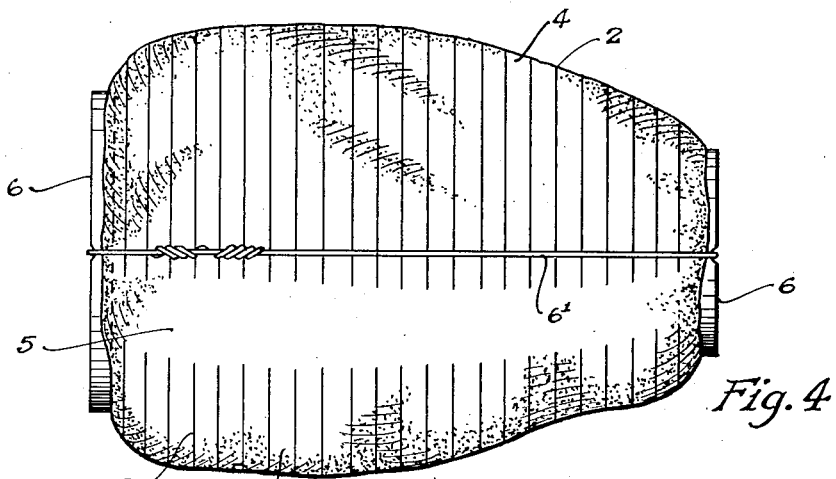
Figure 4 is another view of the ham shown in Figure 3.

Referring to the drawings, Figures 1 and 2 represent a ham 1 successively cut, as indicated at 2, and extending through the bone 3, so as to form slices 4 of uniform thickness. It is to be noted that the slices 4 are held together by a thin strip or shred of meat or skin along one side as at 5, so as to facilitate reassemblage of the slices in their natural pre-cut position, as shown in Figure 1. After slicing, the ham may be wrapped as a whole or as separate slices or groups of slices. In Figures 3 and 4 the slices are shown bounded together by means of wooden disks 6 at the ends and a wire or other tie 6' embracing them so as to hold the cut surfaces snugly in airtight contact.

Figure 5:
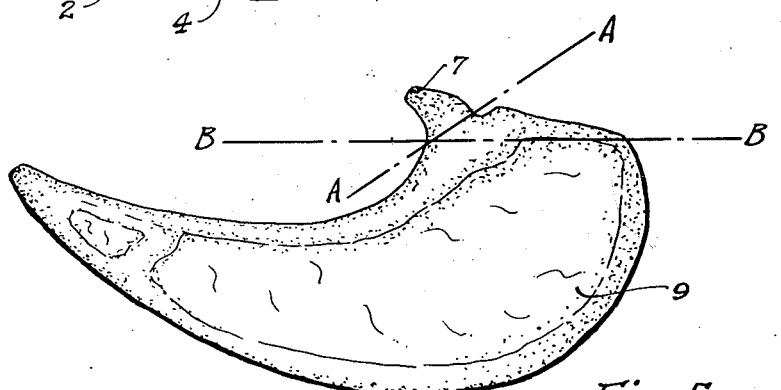
Figure 5 is a detail of a chop to illustrate an improved manner of trimming the same.
Figure 6:
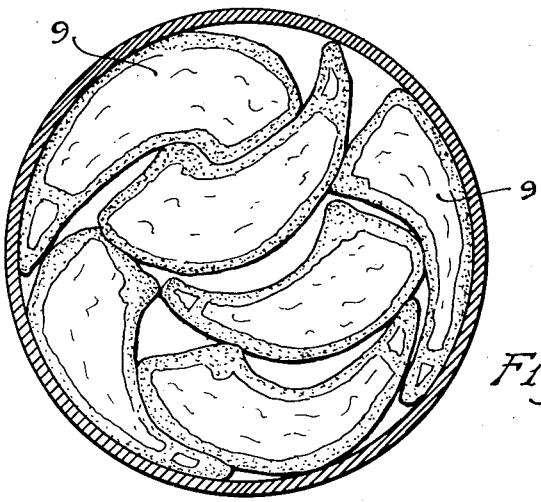

In the packaging of sliced chops, it is desirable to make the appearance as attractive as possible by cutting away the projecting bone parts as illustrated in Figure 5. Before slicing a loin the ridge 7 of the spinal bone may be trimmed off by sawing along planes A or B of Figure 5. The chops cut from such a loin are attractive in shape and require no individual trimming.

The loins are cut transversely as at 8 to form slices 9 of uniform thickness, the cuts being extended uniformly through the bones 10 as well as through the meat. These sliced loins may be assembled each in its natural shape and wrapped as one package 11, or they may be divided into portions of one or more slices to a package in pre-sliced relationship. The small groups of slices may be wrapped in waxed paper or transparent tissue 12 with an attractive label band 13 thereon and then arranged attractively in a display carton as is illustrated in Figures 7 and 8.

The most desirable temperature for proper slicing of frozen meats with a knife-edge cutter, in the purview of this invention, lies within a comparatively narrow range; that is, the meat should be neither too hard nor too soft, but time saving is also an important element in such an industrial process and this requires that the desired uniformity of temperature throughout the mass should be quickly reached.

It has been found by experimentation in carrying out this invention, that when fresh carcass parts, for instance pork, lamb and beef loins, are chilled in a freezer, there is gradually established a gradient of rigidity or hardness, this being greatest at the surface and least at the center. To freeze the entire mass uniformly at the desired temperature for simultaneous slicing of bone and tissue takes considerable time. In order to produce a condition of uniformly appropriate firmness, that is, a condition of cleavable rigidity, from surface to center of a piece of bone-in meat for slicing in a minimum of time, I have found it advantageous to partly freeze the piece at a lower temperature than is desirable for slicing, and then temper it for a brief interval in a higher temperature to permit equalization of firmness at the desired temperature by conductivity within the piece.

If the freezing is insufficient or the flesh around the bone is too soft, the bone will be improperly supported and will shatter or will deflect from the knife and prevent proper slicing.

If the chilling or freezing is carried too far the meat becomes rather brittle and does not slice well, and moreover tends to chip or break, so care is taken to condition the meat to the best state of cleavable rigidity for slicing, for instance at about 18° to 28° Fahrenheit for fresh meats and about 14° to 20° Fahrenheit for cured or salted meats, such as hams.

The preferred temperatures for fresh meats are different from those for cured meats since the presence of salts lowers the freezing point.

Comparative tests have shown, for instance, that this method, as applied to hams, effects a 90% saving of labor in slicing. Moreover the resultant freedom from bone dust and discoloration, the greater smoothness of the cuts, freedom from roughening saw marks in the flesh, and the greater uniformity of slice thickness, all go to enhance the market value of the retail product.

More specifically, a preferred method is to first quickly chill the fresh meat until all but a central part of predetermined size is somewhat frozen, the outer part becoming especially hard, this being effected in a strong draft of frigid air of about 0° to minus 10° F. for 1½ to 15 hours; and then to "temper" the meat or equalize the chill throughout by letting it stand 1½ hours or more in an atmosphere of about 26° to 28° F. It will be understood that small cuts like pork and lamb loins require shorter periods of freezing and tempering than heavy cuts like beef. It will also be understood that the carcass part may be initially quick frozen throughout. After being brought to the proper state of cleavable rigidity throughout, the meat and bone are sliced uniformly, and with practically no splintering of bone or tissue.

Smoked meat needs very little tempering. Salt in meat prevents hard freezing and so obviates need of tempering.

It is found to be most desirable to pack the sliced pork chops, lamb chops, steaks, roasts, etc., in packages and return to a temperature of zero F. to 10° below, using what might be termed a "rapid chilling" unit, where low temperature air is forced over the product in large volume at a very high rate of speed, which shortens the freezing time to a minimum. The wrapped product, being protected from exposure to the air during the final freezing, is not subject to evaporation of the moisture, nor oxidation and the sliced meat therefore retains its color indefinitely.

The important points developed in handling and preparing small retail cuts, such as steaks, chops and roasts by the method of this invention will now be summarized.

1st. Prechilling of the whole cut to a point where it is firm enough so that it can be sliced to any desired thickness of slices, meat, bone and all, on a mechanical power operated slicing machine employing a knife as the cutting element, at the packing plant makes it possible to reduce the cost of cutting such meats into slices ½ to ¾ of an inch in thickness at least 75% to 90% as compared with the methods heretofore used. In certain tests it has been found that two men can now do the work of twenty using former methods in slicing hams.

2nd. Another important point of development is that by cutting and packing the small cuts in a temperature of 26 to 28 degrees Fahrenheit, any chance for deterioration or accumulation of moisture on the cut surface is eliminated. By the return of the finished package of cuts to a temperature of zero to 10° Fahrenheit below zero within one hour after the operation is started, the cut surface retains its original color and shape, which is much more attractive than that of steaks, chops or roasts, prepared in the conventional manner.

3rd. The preparation of retail cuts such as steaks, chops and roasts with a knife cutter slicing machine eliminates the sawing that has heretofore been necessary in preparing bone-in cuts of meat. This is an important point from the appearance standpoint. Another advantage is that the knife cutting operation, to a certain extent, seals the cut surface of the slice instead of tearing it as is the result when a saw is used.

4th. It is found that slices cut from frozen meat separate readily after indefinite cold storage, while slices cut before freezing freeze together in a solid mass and would usually require defrosting to permit separation.

5th. A great saving in weight is effected by knife cutting the bone rather than sawing since the latter results in loss of product converted to sawdust.

It has been found that smoked hams chilled in zero temperature from three to eight hours can be put on a heavy mechanical, knife-edge slicing machine, and sliced throughout the entire length, butt, hock and all in slices of any desired thickness, usually from one-half to three-fourths of an inch thick. By being chilled so that the meat is firm around the bone, the knife cuts through the bone with practically no shattering. It takes about five seconds to slice an entire sixteen pound ham into slices one-half inch thick.

Preferably I take a regular ham, with the skin on, and so slice it that the slices are held together by about one inch of the skin, so that after the ham is sliced, it can be put back together and wrapped into the same sized package as if the ham had never been sliced. It can then be dispensed in groups of any number of slices by merely cutting the uncut strip of skin at the desired point.

The present novel invention contemplates freezing any meat cuts such as pork loins, beef loins, chucks, rounds, lamb cuts, fancy meats, such as liver and smoked meats to a point where the frozen product can be put into a mechanical slicing machine and sliced into any desired thickness suitable for the retail trade.

The slicing machines constitute no part of this invention, and as the process is sufficiently clear from the foregoing description, it is not deemed necessary to illustrate an appropriate slicing machine by drawings.

In the specification and claims the terms "knife-blade" and "knife-edge cutter" are used to distinguish from a saw; and are intended to include all types of knife slicing blades.

It is understood that my invention relates to all animal flesh substances as distinguished from vegetable substances, and that the examples given are for the purpose of illustration and not of limitation. When fresh meat, as distinguished from cured meats, is sliced in a power slicing machine while unfrozen, the slices produced are not exactly the same in thickness throughout their entire area because of the natural "give" of the meat. If frozen, and at temperatures below a condition of cleavable rigidity, meat will, because of the crystalline structure induced by such low temperatures, shatter, and cannot be properly sliced when subjected to the action of a power slicing machine. I have discovered that when sliced while in a substantially uniform frozen condition of cleavable rigidity, the frozen tissue will slice without shattering and the slices produced will be uniform in thickness throughout their entire area, and have surfaces substantially smooth, which is extremely desirable for proper cooking. This is especially true in the case of fancy meats, such as liver, which is extremely difficult to slice evenly unless frozen to a condition of cleavable rigidity.

Although preferred details for the process are herein set forth, it is to be understood that some of the details may be modified or omitted without departing from the spirit of the invention as defined by the following claims.

I claim:

1. The method which consists in quickly chilling a fresh carcass portion to such a degree that the exterior part is more or less frozen while the inner part still remains relatively unfrozen, then tempering the said carcass portion as a whole by letting it stand at a higher temperature for a brief period of time sufficient for the temperature to equalize throughout and bring the meat to a predetermined condition of rigidity to facilitate slicing, and then slicing the carcass part by spaced knifelike cuts.

2. The method which consists in quickly chilling a fresh carcass portion to such a degree that the exterior part is more or less frozen while the inner part still remains relatively unfrozen, then tempering the said carcass portion as a whole by letting it stand at a higher temperature for a brief period of time sufficient for the temperature to equalize throughout and bring the meat to a predetermined condition of rigidity to facilitate slicing, slicing the carcass portion while in such condition by knifelike cuts, then restoring the slices to their natural correlative position, and finally rechilling the same preparatory to holding in storage or for shipment.

3. The method which consists in subjecting a fresh carcass portion for a brief period of time to intense cold whereby the outer part is quickly overchilled, then tempering the same by submitting it briefly to a higher temperature whereby the chill temperature quickly becomes substantially equalized by heat conduction and when the meat reaches a predetermined condition of rigidity subjecting it to mechanical slicing.

HARRY H. McKEE.